(12) United States Patent
Duggan et al.

(10) Patent No.: US 6,921,174 B1
(45) Date of Patent: Jul. 26, 2005

(54) PROJECTION TELEVISION CABINET HAVING A ONE-PIECE REFERENCE STRUCTURE

(75) Inventors: Scott Joseph Duggan, Indianapolis, IN (US); Darin Bradley Ritter, Indianapolis, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 483 days.

(21) Appl. No.: 09/597,802

(22) Filed: Jun. 20, 2000

Related U.S. Application Data

(60) Provisional application No. 60/178,330, filed on Jan. 27, 2000.

(51) Int. Cl.[7] .................. G03B 21/30; G03B 21/22; G03B 21/14; G03B 21/56; H04N 5/74
(52) U.S. Cl. .................. 353/74; 353/47; 353/71; 353/72; 353/75; 353/77; 353/79; 353/97; 353/119; 353/122; 359/460; 348/782; 348/787; 348/789; 348/836; 348/841; 348/843; 348/844
(58) Field of Search .................. 353/47, 71–72, 353/74–75, 77, 79, 97, 119, 122; 362/133; 359/460; 348/383, 782, 785, 836, 787–789, 839, 841, 843–844

(56) References Cited

U.S. PATENT DOCUMENTS

| | | | | |
|---|---|---|---|---|
| 3,804,504 A | * | 4/1974 | Scott .................. | 353/77 |
| 3,930,701 A | | 1/1976 | Otakie .................. | 312/244 |
| 4,006,300 A | * | 2/1977 | Boldt et al. .................. | 348/843 |
| 4,245,256 A | | 1/1981 | Kokubo et al. .................. | 348/789 |
| 4,482,206 A | * | 11/1984 | VanBreemen .................. | 359/457 |
| 4,491,872 A | * | 1/1985 | Boldt et al. .................. | 348/782 |
| 4,506,295 A | * | 3/1985 | Young et al. .................. | 348/787 |
| 4,512,631 A | * | 4/1985 | VanBreemen .................. | 359/457 |
| 4,544,946 A | * | 10/1985 | VanBreemen .................. | 348/779 |
| 4,556,913 A | * | 12/1985 | VanBreemen et al. .................. | 348/782 |
| 4,827,439 A | | 5/1989 | Licht .................. | 361/681 |
| RE34,689 E | | 8/1994 | Wakasa .................. | 348/383 |
| 5,363,149 A | | 11/1994 | Furuno et al. .................. | 348/789 |
| 5,363,150 A | | 11/1994 | Kojima .................. | 710/261 |
| 5,402,263 A | | 3/1995 | Kita et al. .................. | 359/451 |
| 5,408,283 A | | 4/1995 | Lee .................. | 353/77 |
| 5,669,681 A | | 9/1997 | Ishikawa et al. .................. | 312/7.2 |
| 5,742,359 A | | 4/1998 | Han .................. | 348/836 |
| 5,808,704 A | | 9/1998 | Yoshikawa et al. .................. | 348/748 |
| 5,823,641 A | | 10/1998 | Goto et al. .................. | 312/7.2 |
| 5,887,959 A | | 3/1999 | Yuri .................. | 312/7.2 |
| 5,929,945 A | * | 7/1999 | Negishi et al. .................. | 348/825 |
| 5,990,985 A | | 11/1999 | Kim .................. | 348/836 |
| 5,995,170 A | | 11/1999 | Ohira et al. .................. | 348/836 |
| 6,494,582 B2 | * | 12/2002 | Kim .................. | 353/74 |
| 6,709,114 B1 | * | 3/2004 | Duggan et al. .................. | 353/74 |

FOREIGN PATENT DOCUMENTS

| | | |
|---|---|---|
| EP | 0 766 465 | 4/1997 |
| EP | 0 830 021 | 3/1998 |

\* cited by examiner

*Primary Examiner*—Judy Nguyen
*Assistant Examiner*—Magda Cruz
(74) *Attorney, Agent, or Firm*—Joseph S. Tripoli; Joseph J. Laks; Joseph J. Kolodka

(57) ABSTRACT

A cabinet for a projection television system, the cabinet including a one-piece molded structure for mounting the components, and reference surfaces unitary with the structure, for mechanically aligning critical optical components of the television system with one another.

14 Claims, 5 Drawing Sheets

PROJECTION TELEVISION CABINET HAVING A ONE-PIECE REFERENCE STRUCTURE

This application claims the benefit of U.S. Provisional Application No. 60/178,330, filed Jan. 27, 2000, entitled "Projection tv cabinet concept with all critical alignment parts mounted to one reference part".

BACKGROUND

The present invention relates to projection television systems, and more particularly, to a molded plastic television cabinet having reference features molded into one part for aligning the critical optical components of the projection television system.

A conventional projection television (TV) system typically consists of a plurality of critical optical components mounted in a multi-part cabinet structure. The optical components commonly include a light projector assembly for generating television images, a screen for viewing the images, and a large mirror (often combined with a smaller mirror) for directing the images generated by the light projector assembly to the screen. The multi-part cabinet structure usually includes a front section having a screen frame that mounts the screen, a rear section or back cover which mounts the large mirror, a first bracket for mounting the small mirror, and a second bracket for mounting the light projector assembly to the cabinet front section.

Each optical component/cabinet part interface adds tolerance stack to the TV system. In some designs, the large mirror is mounted to a multi-piece sheet metal structure that is mounted to the cabinet front section along with the light projector assembly and the screen. The use of such a multi-piece sheet metal structure to hold the large mirror adds additional tolerance stack into the TV system.

Increased tolerance stack in the location of the critical optical components, undesirably increases geometric distortions of the television images and requires an increased range of adjustment of the optical components to correct these distortions. Accordingly, a cabinet structure is needed that limits the tolerance stack so that minimal or no adjustment is necessary to obtain acceptable geometry.

SUMMARY OF THE INVENTION

The invention is directed to a cabinet for a projection television system having a plurality of optical components. The cabinet includes a one-piece molded structure for mounting the components, and locating features unitary with the structure and for optically aligning the components with one another. The locating features advantageously minimize tolerance stacks for mounting the components. The optical components can include a light projector assembly for generating images, a screen for viewing the images, and at least one mirror for directing the images generated by the light projector assembly to the screen. The locating features can include a pocket and at least one slot that define a reference plane for the mirror, a pocket that defines a reference plane for the screen or a plurality of fastener bosses that define a reference plane for the screen, or a vertical wall that defines a reference plane for the light projector assembly.

In another aspect of the invention there is provided a cabinet for a projection television system, the projection television system has a plurality of optical components and the cabinet includes a one-piece enclosure for mounting the components; and reference surfaces unitary with the enclosure, for optically aligning the components with one another.

In a further aspect of the invention there is provided a cabinet for a projection television system having a plurality of optical components, and the cabinet includes a one-piece molded structure for mounting the components, and locating means unitary with the structure, for mechanically aligning the components with one another.

In a yet further aspect of the invention there is provided a cabinet for a projection television system having a plurality of optical components and the cabinet including a one-piece enclosure for mounting the components; and reference surfaces unitary with the enclosure, for mechanically aligning the components with one another.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily to scale.

DETAILED DESCRIPTION OF THE INVENTION

Figure 1:
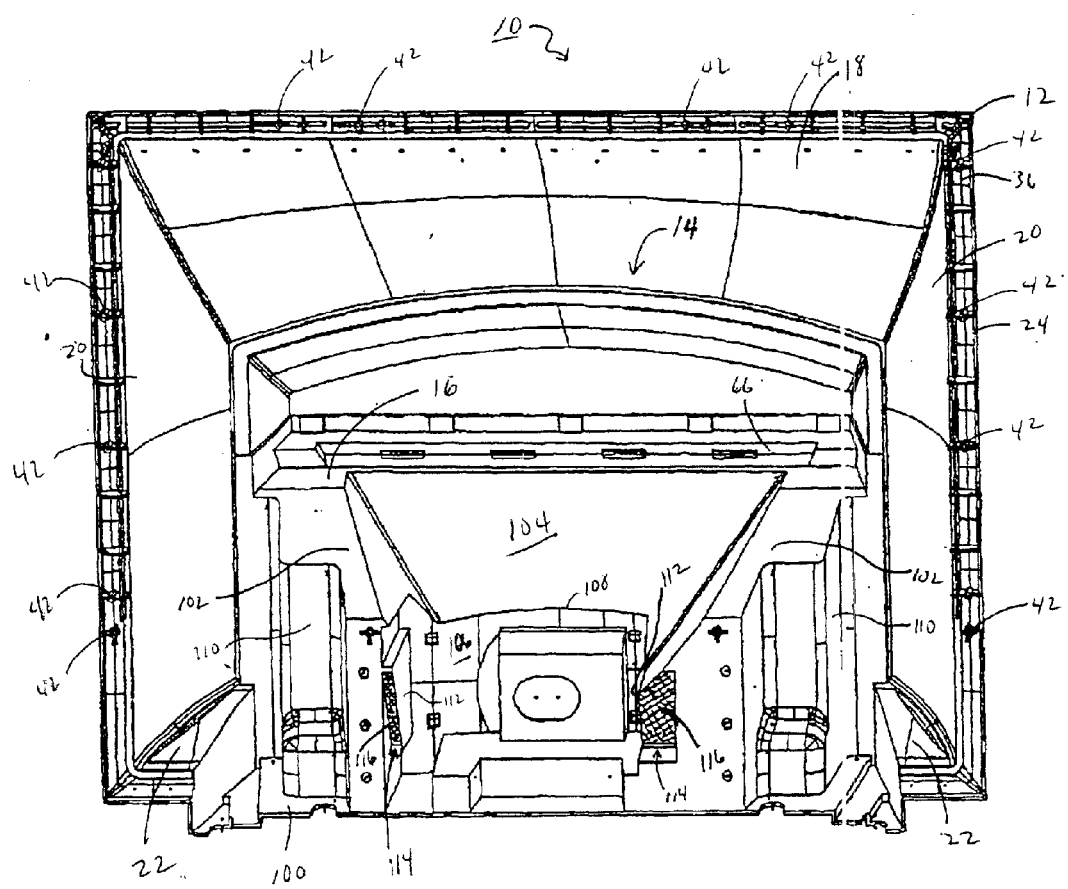
FIG. 1 is a front view of a cabinet made according to a preferred embodiment of the invention.
Figure 2:
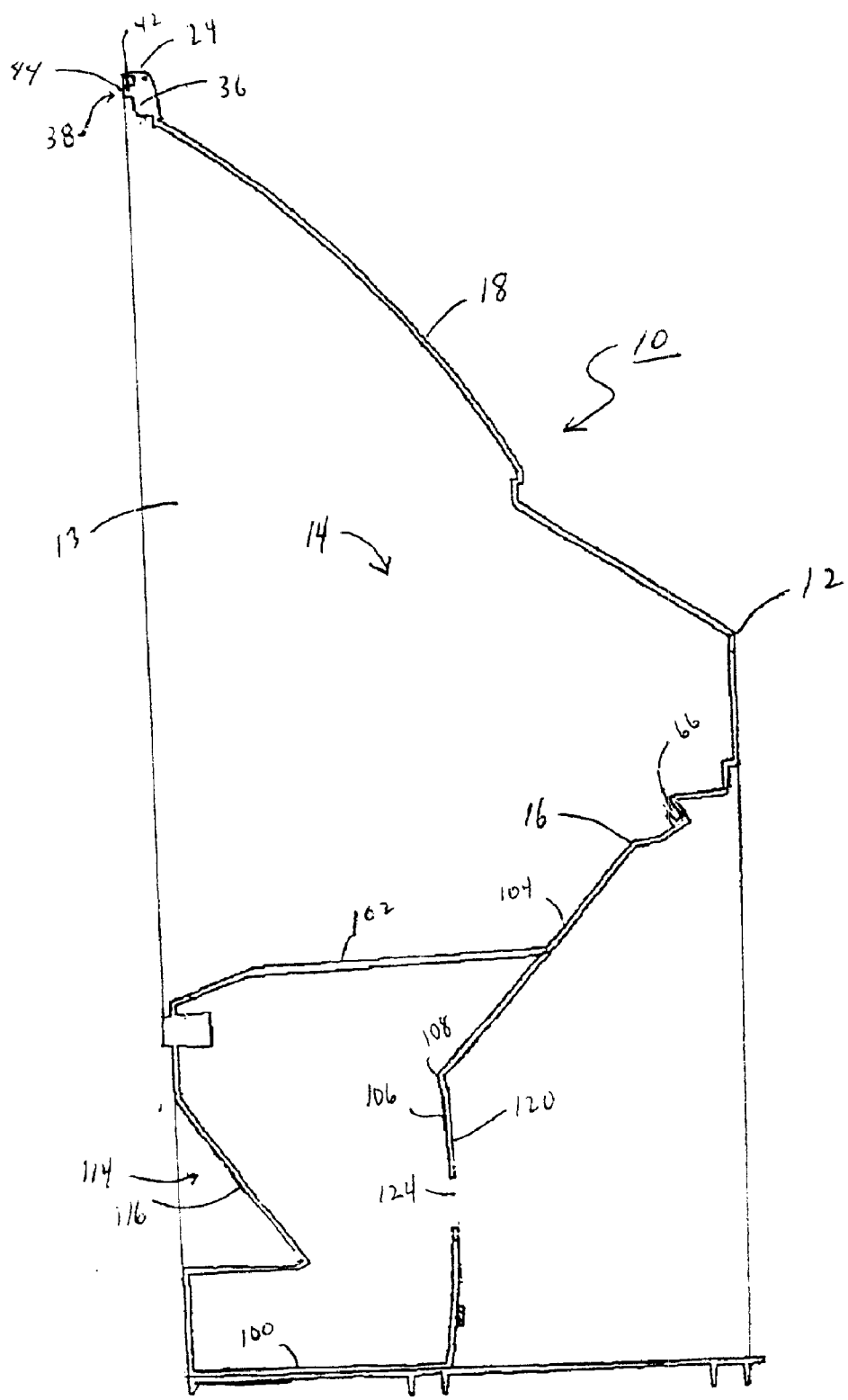
FIG. 2 is a side cross-sectional view of the cabinet of FIG. 1.

FIGS. 1 and 2 collectively illustrate a projection TV system cabinet 10 made according to a preferred embodiment of the invention. The cabinet 10 generally comprises a self-supporting, one-piece, open-front enclosure 12 molded from a plastic material. Preferably, the enclosure 12 is made using a conventional gas injection molding process which minimizes internal stresses in the enclosure 12 and thus, dimensionally stabilizes the enclosure 12. The lower portion 14 of the enclosure 12 defines a frame section 16 that provides the enclosure 12 with rigidity. The frame section 16 is covered by an inclined top wall 18 and surrounded by a pair of side walls 20 with bottom edges 22 that turn inwardly toward the lower frame section 16. A flange 24 is molded with front edges of the top and side walls 18, 20.

Figure 3:
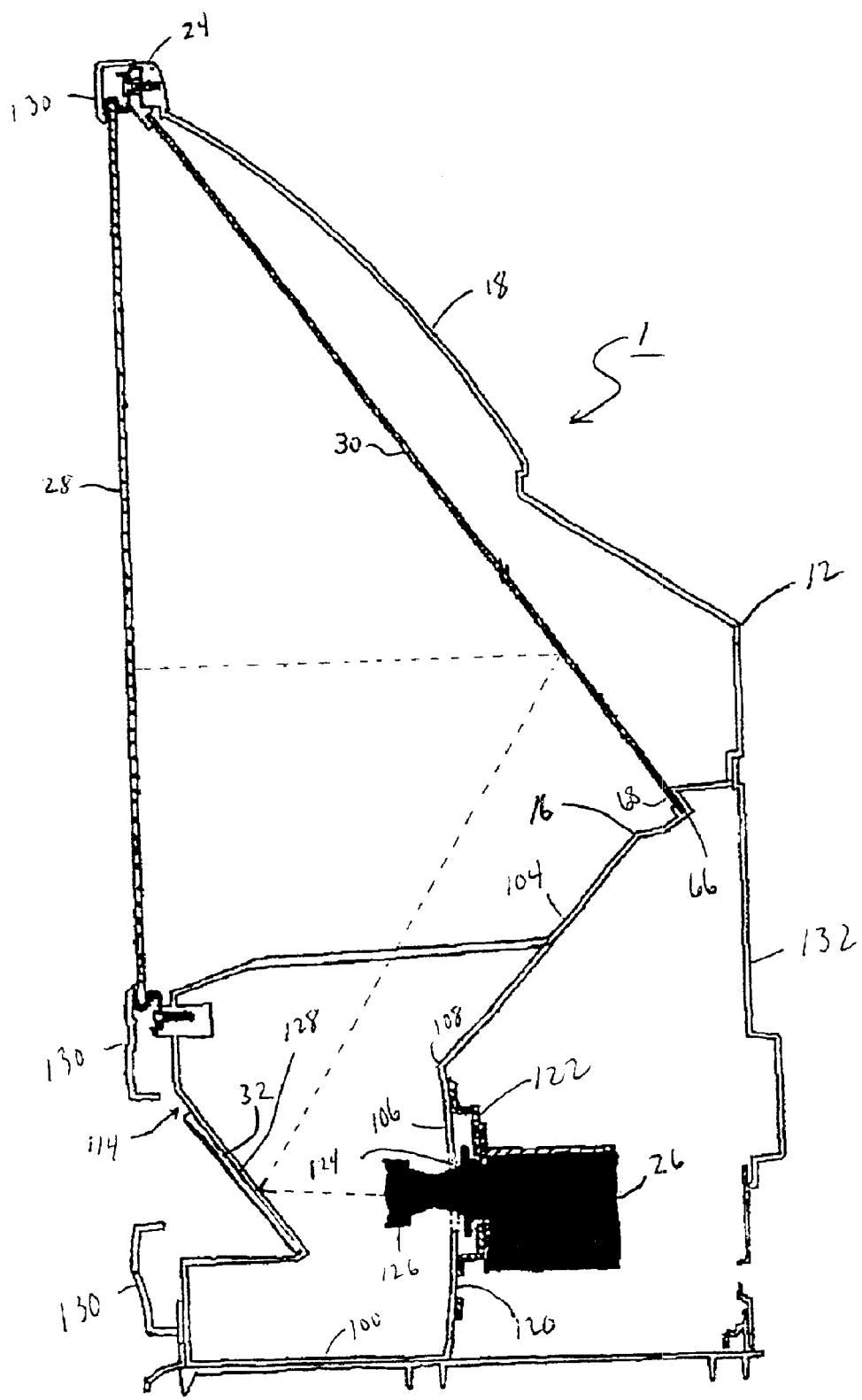
FIG. 3 is a sectional side view of a projection TV system employing the cabinet of FIG. 1.
Figure 4:
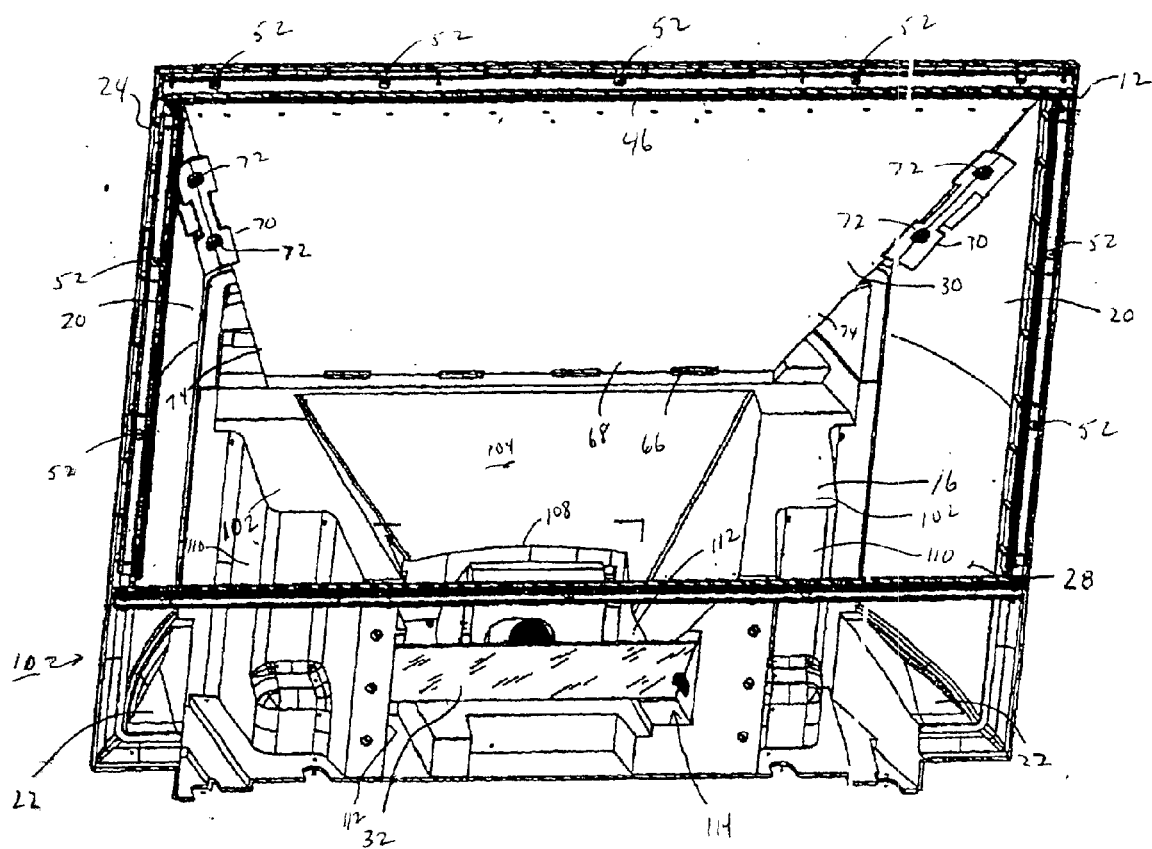
FIG. 4 is a perspective front view of the TV system of FIG. 3.

As shown in FIGS. 3 and 4, the cabinet 10 of the invention houses all critical optical components commonly used in a projection TV system including a light projector assembly 26 for generating television images, a screen 28 for viewing the images, and a large upper mirror 30 and a smaller lower mirror 32 for directing the images generated by the light projector assembly 26 to the screen 28. The enclosure 12 includes locating features, which will be described further on, for referencing each of these optical components 26, 28, 30, 32 therein. These locating features are precisely molded into the enclosure 12 so that when the optical components 26, 28, 30, 32 are mounted therein, the components are properly referenced and therefore, in optical alignment with one another. Molding all or a majority of the locating features into the one-piece enclosure 12 of the cabinet 10 limits the tolerance stack in mounting the optical components 26, 28, 30, 32 in the cabinet 10, which in turn, minimizes geometric distortions. Accordingly, there is little or no need for adjusting the optical components 26, 28, 30, 32 of the TV system to obtain acceptable geometry, as is necessary with in prior art projection TV systems which use conventional multi-piece plastic cabinet structures.

Figure 5:
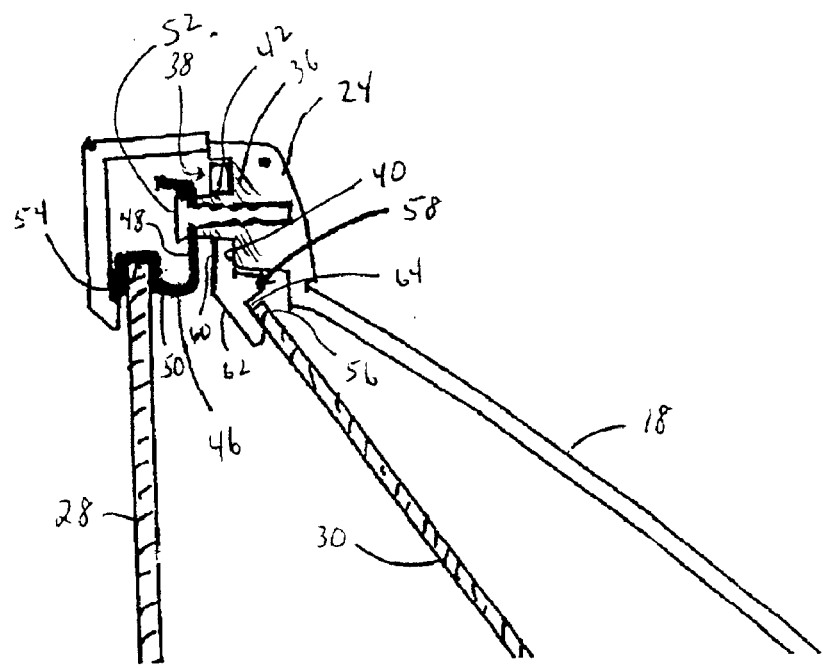
FIG. 5 is an enlarged detailed view of the cabinet flange shown in FIG. 3.

The flange 24 includes locating features for referencing the screen 28 and the top 56 of the large upper mirror 30. More specifically, as best shown in FIGS. 1, 2, and 5, the flange 24 has molded therein a honeycomb arrangement of ribs 36. The rib arrangement 36 is molded to define a recessed pocket 38 having a plurality of cylindrical fastener bosses 42 which project forwardly from the bottom 40 of the pocket 38 (FIG. 2). The end surfaces 44 (FIG. 2) of the bosses 42 cooperate to define a reference plane for precisely locating the screen 28. The screen 28 includes a peripherally disposed screen bracket 46 that mounts the screen 28 to the bosses 42. The screen bracket 46 has an outer arm 48 and a forward arm 50. The outer arm 48 of the bracket 46 is secured against the end surfaces 44 of the bosses 42 via conventional screw-fasteners 52 which extend through apertures (not shown) in the outer arm 48 and thread into the bosses 42. The forward arm 50 of the bracket 46 defines a groove 54 that receives and grips the peripheral edges of the screen 28. The screen bracket 46 adds stiffness and sag resistance to the open front 13 of the enclosure 12.

The bottom 40 of the flange pocket 38 defines a reference plane that precisely locates or references the top 56 of the upper mirror 30. As shown in FIGS. 3–5, the upper mirror 30 includes a mirror bracket 58 that mounts the top 56 of the upper mirror 30 to the bottom 40 of the flange pocket 38. The mirror bracket 58 is a generally planar member 60 having a plurality of apertures (not shown) that permit the bosses 42 and conventional screw fasteners (not shown) to extend therethrough, the fasteners threading into the bottom 40 of the flange pocket 38 and operating to securely retain the mirror bracket 58 against the bottom 40 of the pocket flange 38. The bracket 58 includes a rearwardly angled lower extension 62 that defines a shrouded support surface 64 for supporting the top 56 of the upper mirror 30.

As best seen in FIGS. 2 and 3, the frame section 16 defines a molded in angled slot 66 that precisely locates and secures the bottom 68 of the upper mirror 30 (the bottom 68 of the mirror 30 slides into the slot 66 during assembly). The forward side of the slot is discontinuous to facilitate a simple mold design. The forward side of the slot can also be made continuous if a more complicated mold is used. In FIG. 4, elongated H-shape clamping brackets 70, removably coupled to the side walls 20 with screw fasteners 72, are provided for supporting the sides 74 of the upper mirror 30. Alternatively, slots (not shown) can be molded in the side walls 20 in place of the H-shape clamping brackets 70, for supporting the sides 74 of the upper mirror 30 (the sides 74 and bottom 68 of the upper mirror 30 slide into all three slots during assembly).

Figure 6:
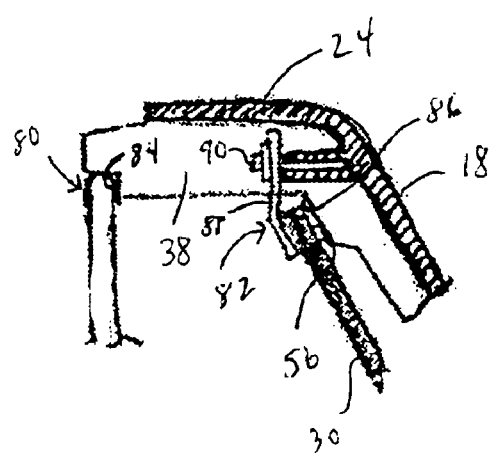
FIG. 6 is a cross-sectional view through the flange of a cabinet according to a second embodiment of the invention.

FIG. 6 depicts a cross-sectional view through the flange 24 of a cabinet according to a second embodiment of the invention where like elements are identified with like numerals. In this embodiment, the honeycomb rib arrangement 38 of the flange 24 is molded with an outer pocket 80 and an inner pocket 82 which respectively locate the screen 28 and the top 56 of the upper mirror 30. A major portion of the periphery of the screen 28 (the top portion, side portions, and partial sections of the bottom portion) is biased against the bottom 84 of the outer pocket 80 with a conventional screen clamping bracket (not shown). The top of the upper mirror 30 is located and biased against the bottom 86 of the inner pocket 82 with a conventional bent-shape clamping bracket 88 and screw-fastener arrangement 90. The bottom 68 and sides 74 of the upper mirror 30 are located as described earlier.

Referring again to FIGS. 1 and 2, the frame section 16 forming the lower portion 14 of the cabinet enclosure 12, is molded to include a supportive bottom wall 100, and a pair of spaced-apart, boxed frame members 102 and an angled upper wall 104 disposed between the frame members 102. A generally vertical wall 106 for mounting the light projector assembly 26 is located between the frame members 102, and extends from the bottom edge 108 of the angled upper wall 104 to the bottom wall 100.

The frame sections 102 are formed by stepped outer side walls 110 and opposing inner side walls 112 having molded in pockets 114 that define forwardly facing angled-down surfaces 116 for locating the lower mirror 32 of the projection TV system. The side edges 118 of the lower mirror 32 reference against the angled surfaces 116 of the pockets 114 while molded in spring fingers or conventional clamping brackets (not shown) bias the lower mirror 32 against these surfaces 116 and prevent dislocation of the lower mirror 32 from the pockets 114 during impact testing.

Referring again to FIG. 3, the light projector assembly 26 is mounted to the rear surface 120 of the vertical wall 106 using a bracket 122. An aperture 124 in the vertical wall 106 permits the optics 126 of the light projector assembly 26 to extend therethrough and face the angled face surface 128 of the lower mirror 32 so that images generated by the projector assembly 26 can be directed to the screen 28 by the lower and upper mirrors 32, 30. Since the vertical wall 106 is a precision molded part of the enclosure 12, the optics 126 of the projector assembly 26 can be pre-aligned with no adjustment provisions. If desired, the vertical wall 106 and the projector assembly mounting bracket 122 can be cooperatively adapted to provide the adjustability needed to achieve acceptable geometry of the light projector assembly 26.

Still referring to FIG. 3, the enclosure 12 of the cabinet 10 can be provided with one or more decorative masks 130 that cover the flange 24 and lower cabinet details. A removable cover 132 is typically attached to the rear of the enclosure 12 for accessing the light projector assembly 26.

While the foregoing invention has been described with reference to the above embodiments, various modifications and changes can be made without departing from the spirit of the invention. Accordingly, all such modifications and changes are considered to be within the scope of the appended claims.

What is claimed is:

1. A cabinet for a projection television system, the projection television system having a plurality of optical components, the cabinet comprising:
   a one-piece, unitarily molded enclosure for mounting the components; and
   locating features unitarily molded with the enclosure which directly engage the components and mechanically align the components with one another wherein the components include a screen and the locating features include at least one surface formed by a boss.

2. The cabinet according to claim 1, wherein the components include a mirror and the locating features include a pocket and at least one slot that define a reference plane for the mirror.

3. The cabinet according to claim 2, wherein the components include a second mirror and the locating features include two pockets that define a reference plane for the second mirror.

4. The cabinet according to claim 1, wherein the components include a screen and the locating features include a pocket that defines a reference plane for the screen.

5. The cabinet according to claim 1, wherein the components include a light projector assembly and the locating features include a vertical wall that defines a reference surface for the light projector assembly.

6. The cabinet according to claim 1, wherein the enclosure is molded from plastic and the locating features minimize tolerance stacks for mounting the components.

7. A cabinet for a projection television system, the projection television system having a plurality of optical components, the cabinet comprising a one-piece unitarily molded structure for mounting the components, the one-piece unitarily molded structure including locating features which directly engage the components and mechanically align the components with one another, the locating features unitarily molded with the structure wherein the optical components include a screen and the locating features for the screen include at least one boss defining a reference plane for the screen.

8. The cabinet according to claim 7, wherein the optical components include a light projector assembly for generating images, a screen for viewing the images, and at least one mirror for directing the images generated by the projector assembly to the screen.

9. The cabinet according to claim 7, wherein the optical components include a mirror, and the locating features for the mirror include a pocket and at least one slot, the pocket and the at least one slot defining a reference plane for the mirror.

10. The cabinet according to claim 7, wherein the optical components include a light projector assembly and the locating features for the light projector assembly include a vertical wall.

11. The cabinet according to claim 7, wherein the optical components include a mirror and the locating features for the mirror include two pockets that define a reference plane for the mirror.

12. The cabinet according to claim 7, wherein the enclosure is molded from plastic.

13. The cabinet according to claim 7, wherein the locating means minimize tolerance stacks for mounting the components.

14. The cabinet according to claim 7, wherein the optical components include a screen and the locating features for the screen include a pocket that defines a reference plane for the screen.

\* \* \* \* \*